April 21, 1942.   E. BUERK   2,280,214
JUICE EXTRACTOR
Filed Aug. 12, 1939   2 Sheets-Sheet 1

INVENTOR
EUGENE BUERK
BY Wheeler, Wheeler & Wheeler
ATTORNEYS.

April 21, 1942.   E. BUERK   2,280,214
JUICE EXTRACTOR
Filed Aug. 12, 1939   2 Sheets-Sheet 2

INVENTOR
EUGENE BUERK
BY
Wheeler, Wheeler & Wheeler
ATTORNEYS

Patented Apr. 21, 1942

2,280,214

UNITED STATES PATENT OFFICE 2,280,214

JUICE EXTRACTOR

Eugene Buerk, Milwaukee, Wis.

Application August 12, 1939, Serial No. 289,771

1 Claim. (Cl. 210—68)

My invention relates to improvements in juice extractors.

The object of my invention is to provide pulp and juice separation equipment which will facilitate pulp disposal and, therefore, permit of continuous operation of a juice extractor without stoppage for batch removal of pulp.

A further object of my invention is to provide improved means for dividing and disintegrating the fiber of material to be acted upon by my juice extractor.

In the drawings.

Like parts are identified by the same reference characters throughout the several views.

Figure 1:
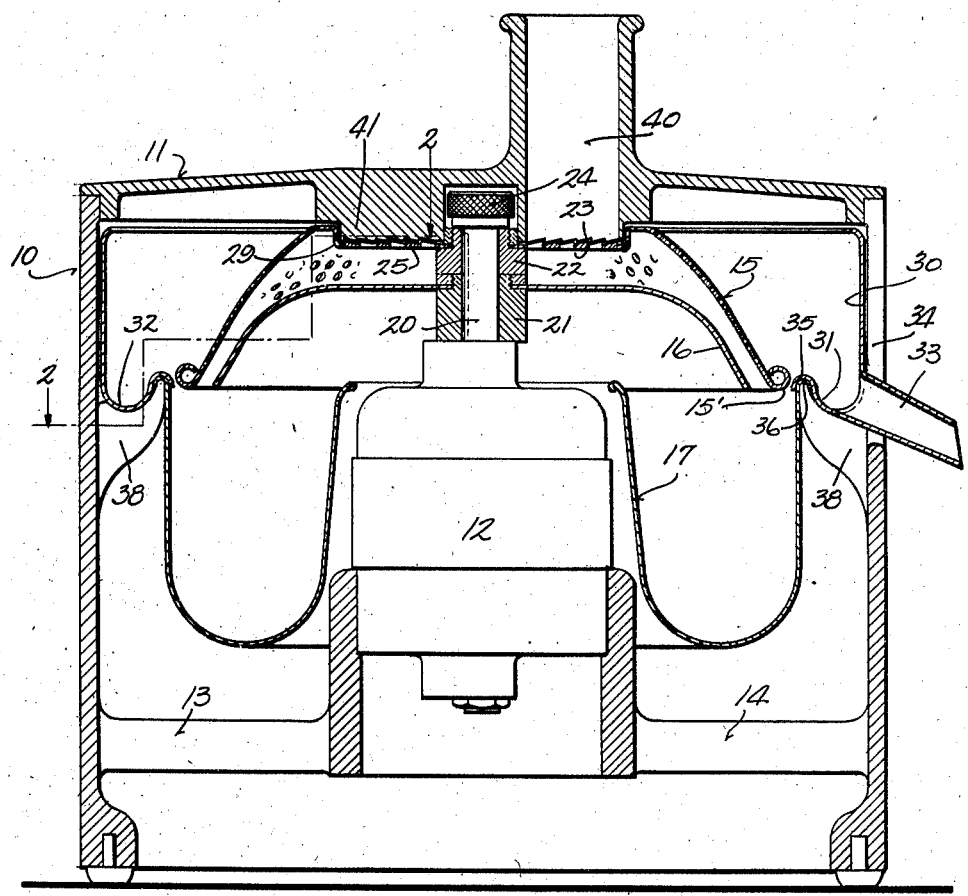
Fig. 1 is a vertical section through my complete juice extractor, the centrally disposed motor being shown in elevation.

The major structural elements of my juice extractor include an annular casing 10, a cover 11 therefor, a motor 12 mounted upon spider arms 13—14, an inverted juice extracting sieve or separator 15, pulp deflector 16 and annular pulp receiving bowl 17. The details with respect to each of these structural elements will now be described.

Pulp shredder and juice separator

The motor 12 is provided with an upwardly extending shaft 20 provided with a hub 21 for the reception of a pulp deflector 16. Above the hub 21 is a spacer 22 upon which a plate-like shredder 23 is receivable. A nut 24 upon the upper end of the shaft bears upon the spacer 22 and the necessary washers, as shown in Fig. 1, to hold the deflector 16 and plate 23 tightly upon the shaft for rotation therewith.

Figure 5:
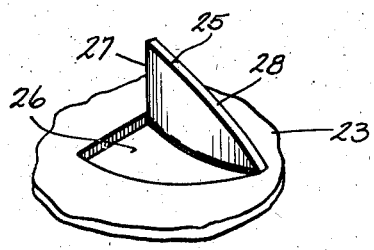
Fig. 5 is a detail of a portion of the shredder plate as showing a tooth in perspective.

Immediately radially of the shaft 20 and its associated parts, the plate 23, as shown most clearly in Fig. 5, has teeth 25 struck up from the material thereof so as to leave apertures in the plate as shown at 26. The configuration of these teeth is important in that the margin 27 thereof is vertical and the top margin is arcuate as at 28. Vegetable or fruit material applied to the plate 23 is shredded by the teeth and the shredded pulp and juice are thrust through the aperture 26.

Figure 2:
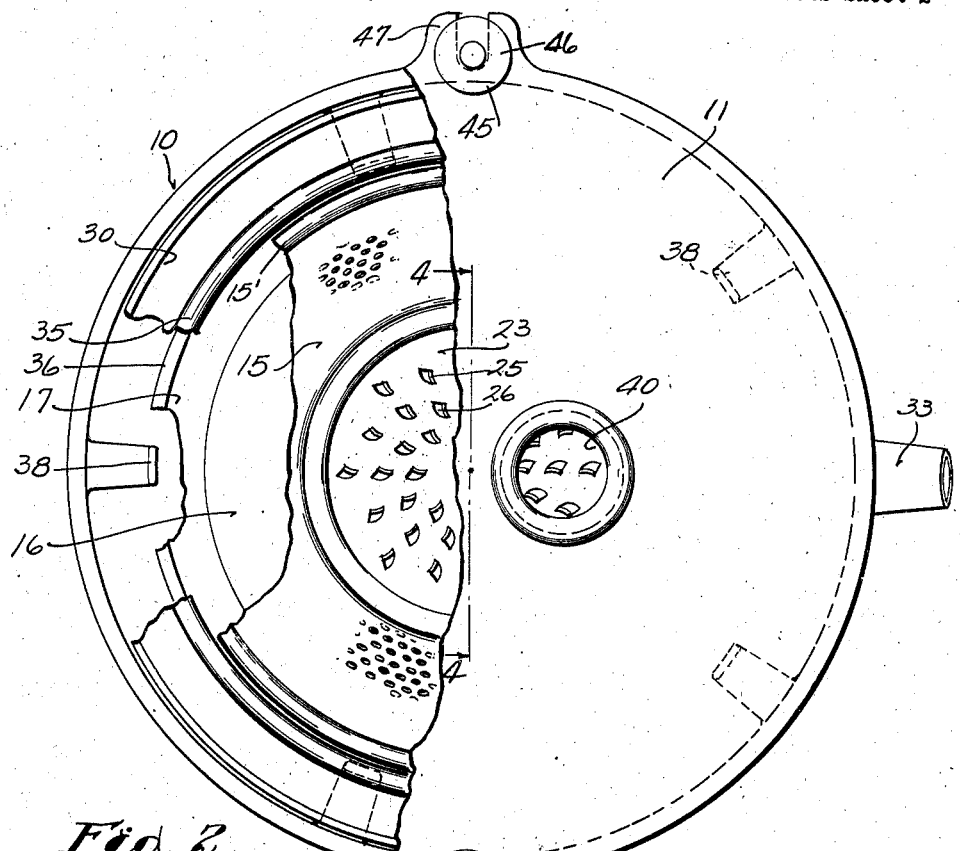
Fig. 2 is a section on line 2—2 of Fig. 1.
Figures 3, 4:
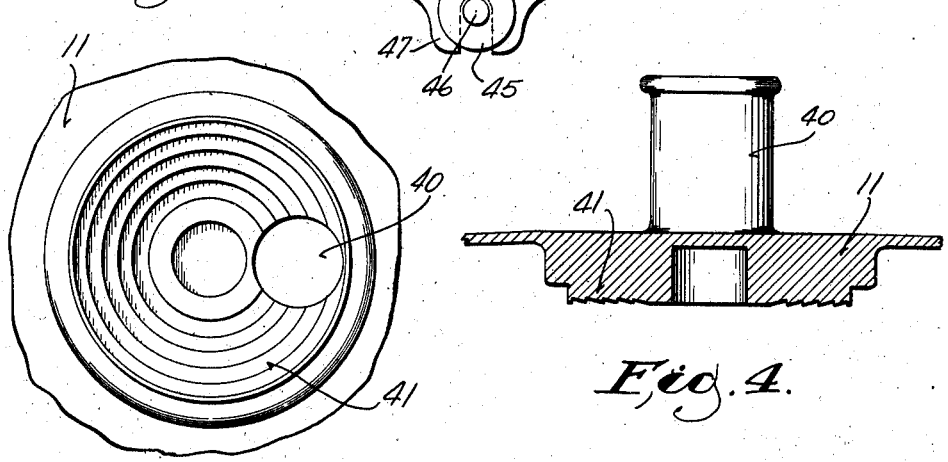
Fig. 3 is a plane view of the shredder and diagrammatically showing the line of travel of the various sets of teeth in the shredder.
Fig. 4 is a section on line 4—4 of Fig. 2.

The teeth upon the plate 23 are arranged irregularly as shown most clearly in Fig. 2, so that the teeth do not merely cut grooves in the substance of a vegetable or fruit to be shredded. Grooves are sufficiently staggered so that material applied to the plate is actually disintegrated fiber from fiber to liberate the juices between the fibers.

In the angle at the outer margin of the shredder plate, I provide apertures 29 to liberate centrifugally any material that may accumulate.

Radially exteriorly of the plate portion 23, the material of the plate is formed upwardly outwardly and then arcuately downwardly to provide an inverted bowl-shaped member 15 which is foraminous and provides surface sufficiently radially distant from the shaft 20 so that in the rapid rotation of the motor a centrifugal separation of juice and pulp or fiber is accomplished. The shape and disposition of the surface of the separator 15 is of importance. The shredded material passing through the apertures 26 in the plate 23 drops downwardly but is thrown outwardly upon the deflector 16 and finds lodgement upon the under surface of the separator 15. Thereafter, in the continued rapid rotation of the separator 15, the fiber is relatively slowly fed outwardly and downwardly along the under surface of the separator until finally it is dropped into the annular pulp bowl 17. In the meantime, centrifugal forces acting upon the heavy juices mixed with the fiber upon the foraminous separator wall are centrifugally thrown against the wall of a juice bowl 30. Juice bowl 30 is annular in shape and has an annular peripheral trough 31 which is shallow at 32 and increasingly deeper adjacent a spout-like outlet 33 which may be inserted through an opening 34 in the exterior wall of the casing 10. The inner peripheral lip 35 of the juice receiving receptacle 30 is shaped to complementarily rest upon the curved lip 36 of the outer margin of the annular pulp receiving bowl 17.

Pulp receiving bowl

The pulp receiving bowl 17 is annular in shape and is relatively deep to encompass the motor 12. Pulp that has been centrifugally fed along the under side of the separator 15 is passed to the bowl 17 by gravity, since the lower margin 15' of the separator 15 extends sufficiently into the pulp receiving bowl 17 so as to prevent pulp from passing over the lip 35 into the juice receiving portion of my separator. My pulp receiving bowl may be supported upon hangers 38 forming part of the structure of the casing 10 or they may be supported upon a spider carried by the motor, but I prefer to carry the bowl upon a hanger structure such as shown at 38, since ventilation of the motor must be unimpeded around the casing of the motor itself.

Cover and feeding apparatus

While it is common in juice extractors to provide an eccentrically positioned tubular feeding opening 40 for the fruit or vegetables to be fed to the shredding plate 23, I have provided in the cover 11 an additional member 41 comprising a feeder block complementary to the surface of the shredder plate 23 to assist in forcing the fruit or vegetable fiber and juice material through the shredder plate with its openings 26, since it is necessary in the operation of my separator that all of the pulp and all of the juice pass through the plate into the zone beneath the inverted bowl-like separator member 15.

Provision for dismantling and cleaning

The cover 11 is provided with means for holding it tightly upon the casing 10. Knurled nuts 45 upon screws 46 secured to the casing bear upon ears 47 integral with the cover 11 for this purpose. Upon release of the knurled nuts, the cover may be removed to expose the nut 24, which, when removed, enables the operator to remove the separator 15 and its shredder plate. Spacer 22 and the deflector plate 16 are then easily removed from shaft 20 and juice bowl 30 and pulp bowl 17 may be lifted from their supports.

From the above description, it will be seen that I have provided a distinctly novel juice extractor wherein the juice and pulp is fed through the shredder plate 23 into the zone beneath a separator 15 and, in conjunction with the baffle plate 16, which rotates with the separator and with the motor shaft, I have provided means for carrying on the separation operation with simultaneous disposal of the pulp relatively centrally of the machine and without danger of mixture of pulp and juice.

From my practical test of a separator or extractor made in accordance with my invention, it appears that the shape of the inverted bowl-like separator and the angle of the separating sieve-like surfaces is not critical. That is true where I use a motor having a speed of approximately three to four thousand revolutions per minute with a separator approximately 8" in diameter. In fact, it appears to be one of the important features of my invention that the separating process is carried out successfully within a relatively wide range of angles at which the separating surfaces are disposed. I have found that the angle shown in the drawings herewith is especially suited to the extraction of fruit and vegetable juices from the pulp of such products, such as citrous fruit, carrots, beets and other garden vegetables.

I claim:

A juice extractor including a motor device and a revolvable power shaft extending upward therefrom, an inverted bowl shaped sseparator upon the upper portion of said shaft, a juice receiving receptacle thereabout, and a pulp receiving receptacle comprising an annular member about said motor device, the outer lips of said pulp receiving receptacle being in pulp receiving position adjacent the periphery of the bowl shaped separator, and a deflector mounted upon the shaft below the separator and extending over the motor and into the pulp receiving receptacle to protect the motor.

EUGENE BUERK.